United States Patent
Romano et al.

(10) Patent No.: US 10,480,604 B2
(45) Date of Patent: Nov. 19, 2019

(54) SHOCK ABSORBER

(71) Applicant: HITACHI AUTOMOTIVE SYSTEMS AMERICAS, INC., Harrodsburg, KY (US)

(72) Inventors: Michael Romano, Farmington Hills, MI (US); Jahan Assadi, Ann Arbor, MI (US); Prashanth Avireddi, Farmington Hills, MI (US); Nikhil Seera, Farmington Hills, MI (US)

(73) Assignee: Hitachi Automotive Systems Americas, Inc., Harrodsburg, KY (US)

( * ) Notice: Subject to any disclaimer, the term of this patent is extended or adjusted under 35 U.S.C. 154(b) by 0 days.

(21) Appl. No.: 15/325,120

(22) PCT Filed: Jul. 27, 2015

(86) PCT No.: PCT/US2015/042237
§ 371 (c)(1),
(2) Date: Jan. 10, 2017

(87) PCT Pub. No.: WO2016/015047
PCT Pub. Date: Jan. 28, 2016

(65) Prior Publication Data
US 2017/0191542 A1 Jul. 6, 2017

Related U.S. Application Data

(60) Provisional application No. 62/029,020, filed on Jul. 25, 2014.

(51) Int. Cl.
*F16F 9/348* (2006.01)
*F16F 9/34* (2006.01)
*F16F 9/32* (2006.01)

(52) U.S. Cl.
CPC .......... *F16F 9/3484* (2013.01); *F16F 9/3242* (2013.01); *F16F 9/34* (2013.01); *F16F 2230/06* (2013.01)

(58) Field of Classification Search
CPC .... F16F 9/3484; F16F 9/3242; F16F 2230/06; F16F 9/348; F16F 9/34; F16F 9/185
See application file for complete search history.

(56) References Cited

U.S. PATENT DOCUMENTS 2,107,974 A * 2/1938 Carrouee ................ F16F 9/185
                                                              188/318
2,653,683 A * 9/1953 Strauss ................ F16F 9/3242
                                                              137/493.8

(Continued)

FOREIGN PATENT DOCUMENTS

GB        2266133 A      10/1993

OTHER PUBLICATIONS

International Search Report of PCT/US2015/042237 dated Oct. 22, 2015.

*Primary Examiner* — Xuan Lan Nguyen
(74) *Attorney, Agent, or Firm* — Mattingly & Malur, PC

(57) ABSTRACT

A shock absorber having an outer tube, an inner tube disposed coaxially in the outer tube and a piston reciprocally mounted in the inner tube. The interior of the inner tubes forms a working chamber for hydraulic oil while an annular replenishment chamber is formed between the inner and outer tubes. An improved base plate and base cage assembly facilitates fluid flow from the replenishment chamber to the working chamber during an extension cycle of the shock absorber.

4 Claims, 3 Drawing Sheets

(56) References Cited

U.S. PATENT DOCUMENTS

| | | | | | |
|---|---|---|---|---|---|
| 3,113,644 | A | * | 12/1963 | Wossner | F16F 9/3214 188/282.5 |
| 3,180,453 | A | * | 4/1965 | Murata | F16F 9/34 137/514 |
| 3,958,673 | A | * | 5/1976 | Allinquant | B60G 13/08 188/322.14 |
| 4,064,977 | A | | 12/1977 | Taylor | |
| 4,673,068 | A | * | 6/1987 | De Bruijn | F16F 9/3484 188/315 |
| 5,630,485 | A | * | 5/1997 | Beck | F16F 9/3242 137/493.8 |
| 2013/0020159 | A1 | * | 1/2013 | Groves | F16F 9/3484 188/313 |
| 2013/0192457 | A1 | | 8/2013 | Ashiba | |

* cited by examiner

SHOCK ABSORBER

CROSS-REFERENCE TO RELATED APPLICATIONS

This application claims priority of U.S. Provisional Application 62/029,020 filed Jul. 25, 2014, the contents of which are incorporated herein by reference.

BACKGROUND OF THE INVENTION

I. Field of the Invention

The present invention relates to shock absorbers.

II. Description of Related Art

Most light vehicles, such as automobiles, utilize shock absorbers to improve the ride for the occupants. The shock absorbers ideally maintain the chassis of the vehicle in a level or near level position despite variations in the height of the road surface.

Shock absorbers are vital for absorbing energy transmitted to the vehicle chassis due to unevenness of the road surface. Since many road surfaces are uneven, the performance of the shock absorber is important to reducing the energy transfer from the road to the vehicles and the vehicle chassis, as well as improving the comfort of the ride for the occupants.

Most shock absorbers include an outer tube, an inner tube coaxially mounted within the outer tube, and a piston that is reciprocally mounted within the interior of the inner tube. A base valve assembly is attached at the end of the inner and outer tubes and regulates the fluid flow between an outer annular replenishment chamber formed between the inner tube and the outer tube, and a main working chamber within the interior of the inner tube. The piston which is reciprocally mounted within the inner tube is immersed within a hydraulic fluid. In addition, the inner tube of a shock absorber is oftentimes known as the pressure tube while the outer tube is known as the reserve tube. The reserve tube stores the excess hydraulic fluid in the shock absorber in the annular outer or replenishment chamber.

Conventionally, the piston for the shock absorber is attached to the chassis of the motor vehicle. The inner tube, in turn, is attached to the wheel structure of the suspension system so that the inner tube moves in unison with the vertical movement of the wheel. Consequently, as the wheel encounters either bumps or depressions in the road surface, the piston reciprocates within the inner surface in an attempt to maintain the piston, and thus the chassis, at an even vertical position.

In order to dampen the impact of jolts or bumps from the road surface, a base valve assembly regulates the fluid flow between the working chamber and the replenishment chamber. Additionally, orifices through the piston permit fluid flow through the piston in order to dampen the effects of an uneven road surface.

Shock absorbers work in two distinct cycles, namely the compression cycle and the extension cycle. The compression cycle, also known as the bound cycle, occurs as the piston moves downwardly into the shock absorber thus compressing the hydraulic fluid in the shock absorber working chamber below the piston. Conversely, the extension cycle, also known as the rebound cycle, occurs as the piston moves outwardly towards the top of the pressure tube thus extending the overall length of the shock absorber. This, in turn, compresses the fluid in the working chamber above the piston.

One disadvantage of the previously known shock absorbers of the type used in the automotive industry is that these previously known shock absorbers exhibit hysteresis, which is the lag existing in the replenishment of the working chamber of the shock absorber during the rebound stroke. A lag or incomplete replenishment during the rebound stroke will reduce the amount of oil flowing from the outer or replenishment reservoir and to the inner or working chamber. The incomplete replenishment of the working chamber of the shock absorber with oil will adversely affect the dampening characteristics of the shock absorber during the bound stroke.

Consequently, most modern shock absorbers do not exhibit the perfect or ideal response from an uneven road surface, but rather variations in the dampening curves during the rebound cycle as a result of hysteresis. Furthermore, the hysteresis of the shock absorber is largely dependent upon the geometric design of the base valve assembly of the shock absorber which regulates fluid flow between the replenishment and the working chamber.

SUMMARY OF THE PRESENT INVENTION

The present invention provides a base valve assembly for a shock absorber which improves the flow characteristics between the replenishment chamber and the working chamber, especially during the extension stroke, and thus reduces hysteresis of the shock absorber.

In brief, the base valve assembly in accordance with the present invention includes a generally cylindrical base plate which is attached to the inner and outer tubes which form the replenishment and working chamber for the shock absorber. As before, a piston is reciprocally mounted within the working chamber of the inner tube.

A base cage is then positioned over the base plate. The base cage includes a first set of fluid passageways which fluidly connect the inner working chamber to the outer replenishment chamber during the compression stroke of the piston. This first set of fluid passageways is generally circular in cross-sectional shape.

A second set of fluid passageways also fluidly connect the outer replenishment chamber to the inner working chamber, but do so upon the extension stroke of the piston. This second set of fluid passageways are formed by arcuate, elongated slots formed through the base cage around the first set of slots so that the ends of the slots are positioned closely adjacent each other. By doing so, maximum flow can occur through the second set of fluid passageways during the extension cycle.

A first flap valve is associated with the first set of fluid passageways to limit the fluid flow through the first set of fluid passageways only during the compression cycle. Conversely, a second flap valve is associated with the second set of fluid passageways to limit fluid flow from the replenishment chamber into the working chamber during an extension stroke.

In order to further improve the oil flow through the base valve assembly, the radially inner walls of the second set of passageways, i.e. the elongated slots, extend outwardly from an outer end of the base cage. Furthermore, the outer radial side of the slots either extends radially outwardly from the slot or slopes slightly inwardly relative to the axial length of the shock absorber. Consequently, the fluid flow of oil from the replenishment chamber and to the working chamber during an extension stroke flows freely underneath the base cage and against the inner wall of the slots. The inner wall of the slots then directs the fluid flow upwardly through the slots and into the working chamber.

In order to further reduce the flow resistance of the hydraulic oil from the replenishment chamber, through the slots, and into the working chamber, a frustoconical reflector surface is formed on the base plate in alignment with the slots forming the second set of fluid passageway. Consequently, during an extension cycle, the fluid flow from the replenishment chamber is deflected upwardly through the slots by the reflector surface thus minimizing flow resistance.

By minimizing the flow resistance of the oil through the base valve assembly, especially during an extension cycle, the shock absorber hysteresis is substantially reduced thereby improving the overall performance of the shock absorber.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
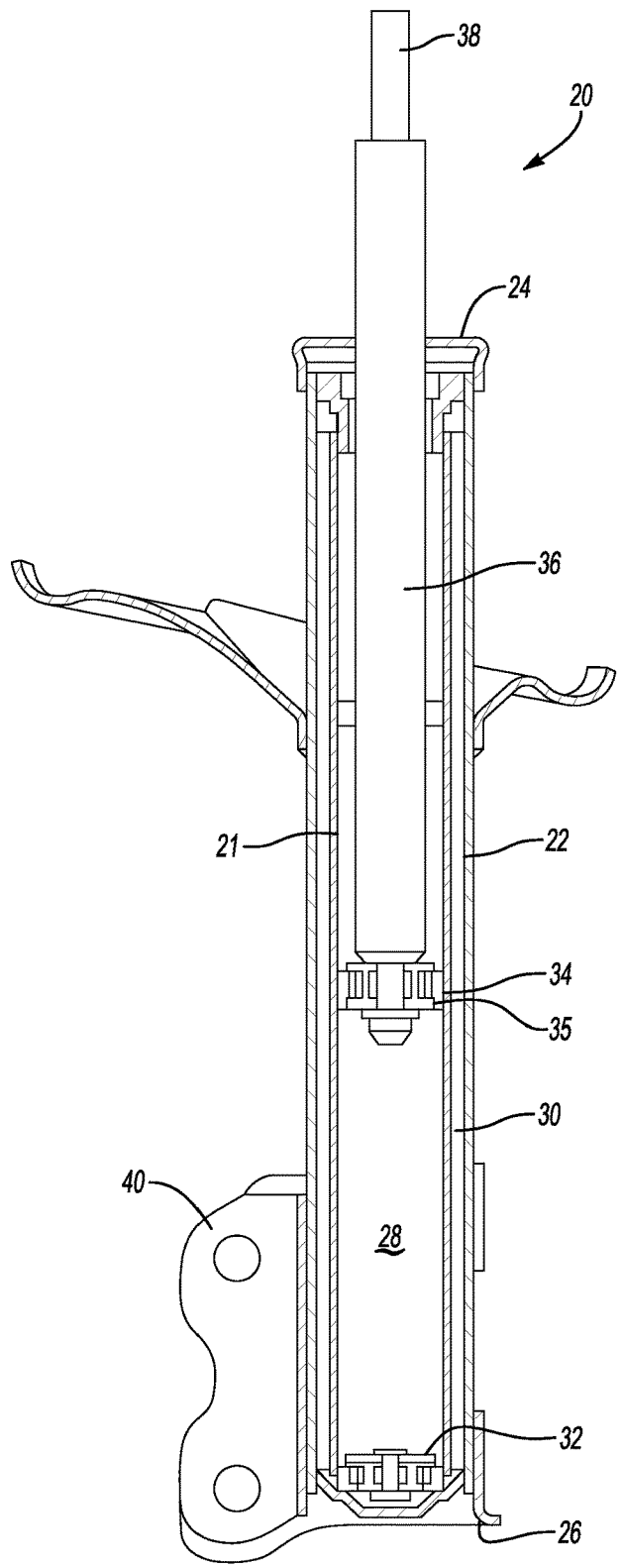
FIG. 1 is a longitudinal sectional view illustrating a shock absorber utilizing the base valve assembly of the present invention.

With reference to FIG. 1, a shock absorber 20 is shown of the type used in automotive light vehicles, such as cars, light trucks, etc. The shock absorber 20 includes an outer tube 22 and an inner tube 21 which is coaxially disposed within the outer tube 22. The inner and outer tubes 21 and 22 are secured together at both their upper end 24 and lower end 26. The inner tube 21 thus divides the outer tube 22 into two distinct fluid chambers, namely a cylindrical working chamber 28 formed by the interior of the inner tube 21, and an annular replenishment chamber 30 formed in between the inner and outer tubes 21 and 22. A base valve assembly 32, which will be shortly described in greater detail, controls the fluid flow between the replenishment chamber 30 and the working chamber 28.

A piston 34 having its outer periphery sealed to the inner periphery of the inner tube 21 is reciprocally slidably disposed within the working chamber 28 of the inner tube 21. A piston rod 36 is attached to the piston 34 and this piston rod 36 extends outwardly through an opening in the upper end 24 of the shock absorber 20.

In use, an upper end 38 of the piston rod 36 is attached to the chassis of the vehicle. Conversely, the lower end 26 of the shock absorber 20 is attached to the vehicle suspension system so that the lower end 26 of the shock absorber 20 moves vertically in unison with the suspension system and thus with the wheels for the automotive vehicle. Any conventional mechanism, such as a bracket 40, may be used to attach the lower end 26 of the shock absorber 20 to the suspension system.

The piston 34 also contains through orifices 35 to permit fluid flow between an upper and a lower portion of the working chamber 28. These orifices may be valved and are conventional in construction.

Figure 2:
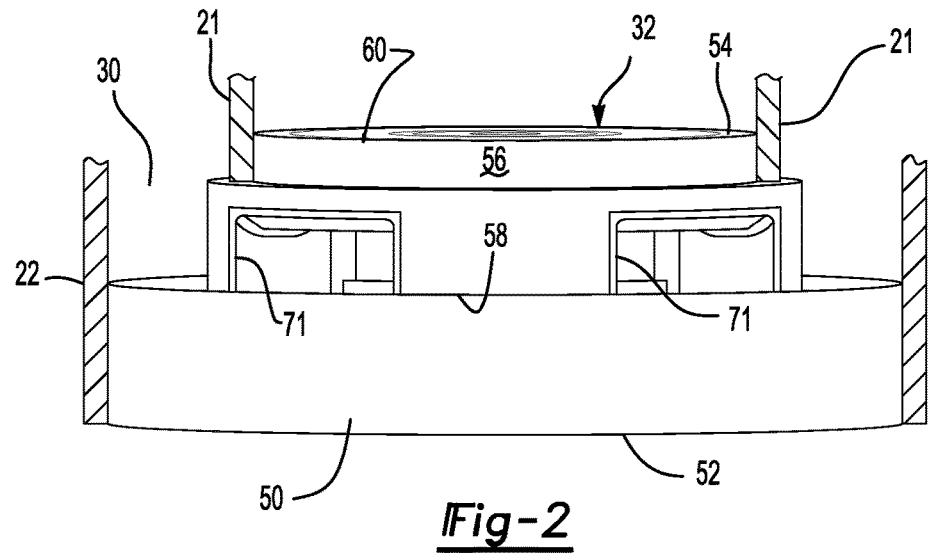
FIG. 2 is a side view illustrating a preferred embodiment of the base valve assembly.

With reference now to FIG. 2, the base valve assembly 32 is there shown in greater detail. The base valve assembly 32 includes a base plate 50 which is generally cylindrical in shape having an outer end 52 and an inner end 54. The base plate 50 is attached to the lower end of the outer tube 22 thus fluidly sealing the lower end of the outer tube 22.

A cylindrical base cage 56 has its outer or lower end 58 supported by the base plate 50. An upper end 60 of the base cage 56 is open to the working chamber 28.

Figure 4:
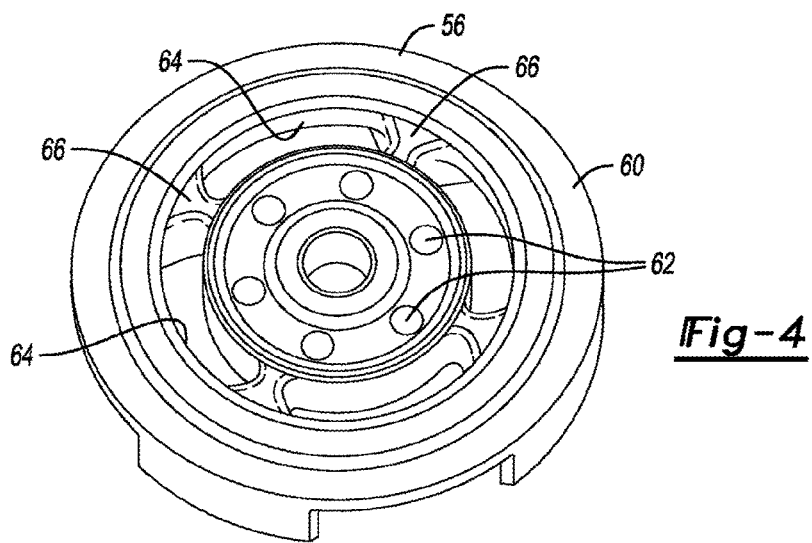
FIG. 4 is a top elevational view illustrating the base cage assembly.

With reference now to FIG. 4, the base cage 56 has a plurality of circumferentially spaced fluid passageways 62 which extend between the axial ends 58 and 60 of the base cage 56. Similarly, a plurality of arcuate slots 64 are also formed axially between the ends 58 and 60 of the base cage 56. These slots 54 form a second set of axially extending fluid passageways through the base cage 56 and are positioned radially outwardly from the first set of passageways 62.

Still referring to FIG. 4, the ends of adjacent slots 64 are positioned closely adjacent each other so that only very narrow webs 66 on the base cage 56 separate the slots 64 from each other. Consequently, these slots 64 establish free communication through the base cage 56.

Figure 3:
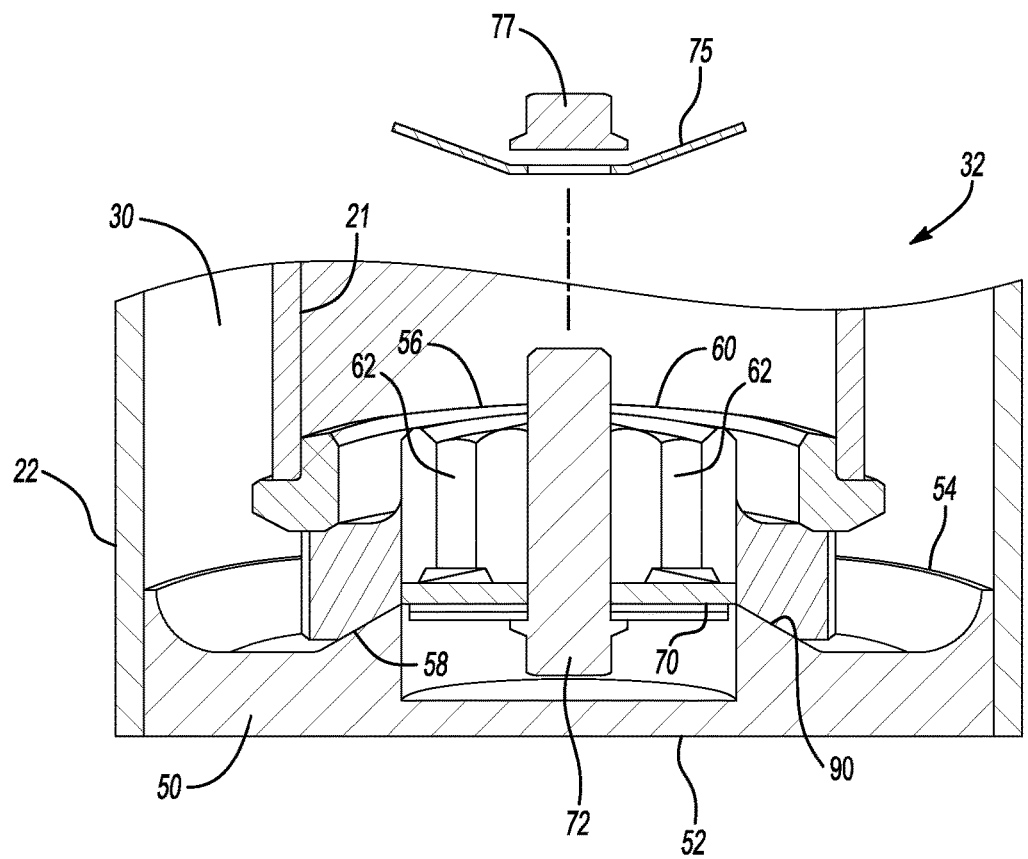
FIG. 3 is a longitudinal sectional view of the base valve assembly.
Figure 5:
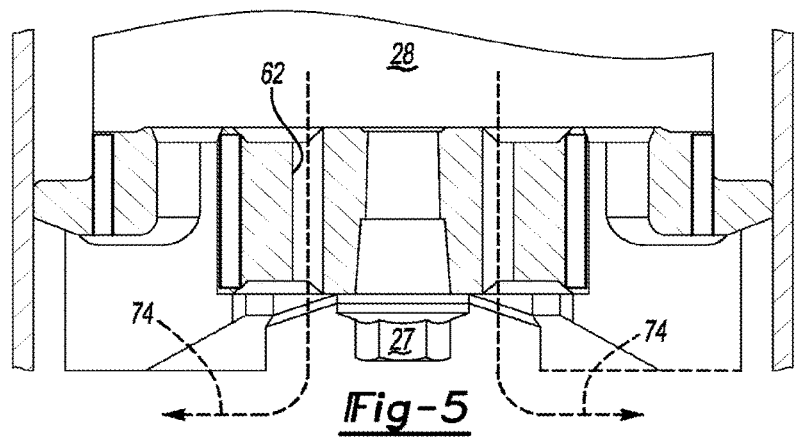
FIG. 5 is a diagrammatic longitudinal sectional view illustrating the oil flow during a compression cycle.

With reference to FIG. 3, a first base valve 70 is attached to the base cage 56 so that the base valve 70 overlies the first set of passageways 62 on the outer end 58 of the base cage 56. The base valve 70 is secured in position by a bolt 72. However, in the event of a compression cycle of the shock absorber, i.e. when the pressure within the working chamber 28 increases due to the downward movement of the plunger 34, the increased pressure in the working chamber 28 causes the base valve 70 to open, as shown in FIG. 5, and allow fluid flow from the working chamber 28, through side openings 71 (FIG. 2) in the base cage 56 and to the replenishment chamber 30 as shown by arrows 74.

Figure 6:
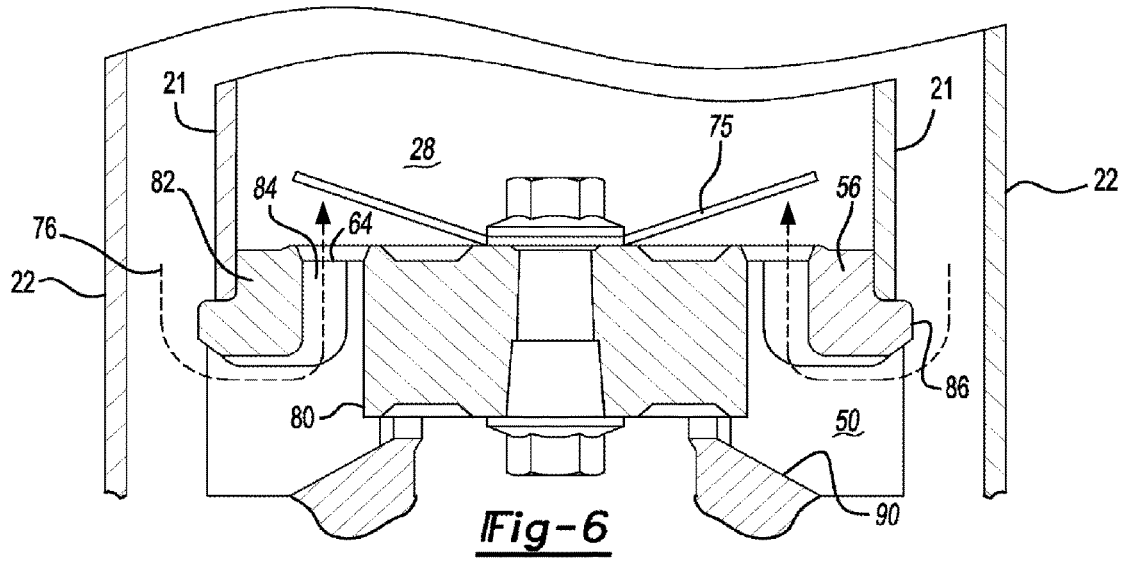
FIG. 6 is a view similar to FIG. 5, but illustrating the oil flow during an extension cycle of the shock absorber.

With reference now to FIGS. 3 and 6, a second base valve 75 is secured by a nut 77 to the base cage 56 so that the valve 75 extends over the slots 64 but has openings aligned with the passageways 62. During an extension event, the pressure within the working chamber 28 is reduced. This, in turn, causes the second base valve 75 to open and permit fluid flow from the replenishment chamber 30 to the main chamber 38 as shown by arrows 76.

In order to reduce flow resistance from the replenishment chamber 30 and to the working chamber 28 during an extension cycle, an inner wall 80 of each slot 64 in the second set of fluid passageways extends downwardly past the opening which forms the slot. In addition, a lower surface 82 of the base cage 56 extending radially outwardly from an outer wall 84 of the slot 64 extends radially outwardly or slopes upwardly from the slot 64. Consequently, the fluid flow of the hydraulic fluid from the replenishment chamber 30 to the working chamber 28 is generally unimpeded and, indeed, the inner wall 80 of the slot 64 directs the flow up through the slots 64.

Still referring to FIG. 6, an outer peripheral edge 86 of the base cage 56 is also rounded in order to facilitate fluid flow from the replenishment chamber 30 and to the working chamber 28 during an extension cycle.

Still referring to FIG. 6, in order to further direct the fluid flow from the replenishment chamber 30 and up through the slots 64 during an extension cycle, a frustoconical surface 90 is formed on the base 50 which is aligned with the slot 64. This frustoconical surface 90 also slopes axially downwardly and radially outwardly from its inner end and to its outer end so that, during an extension cycle, the surface 90 reflects and directs the hydraulic oil towards the slots 64 in the base cage 56.

From the foregoing, it can be seen that the present invention provides a design for a base valve assembly for a shock absorber which reduces flow restrictions during an extension cycle for the shock absorber. By thus reducing the flow restrictions, hysteresis of the shock absorber is improved which increases the overall performance of the shock absorber.

Having described our invention, however, many modifications thereto will become apparent to those skilled in the art to which it pertains without deviation from the spirit of the invention as defined by the scope of the appended claims.

We claim:

1. A base valve assembly able to be used in conjunction with a shock absorber of a type having an outer tube, an inner tube, and a piston reciprocally mounted in an interior of the inner tube, the base valve assembly regulating fluid flow between an annular outer replenishment chamber formed between the outer tube and the inner tube and an inner working chamber formed by the interior of the inner tube, the base valve assembly comprising:
    a base plate,
    a base cage positioned on the base plate, the base cage having a first set of fluid passageways which fluidly connect the inner working chamber to the annular outer replenishment chamber upon a compression stroke of the piston, and a second set of fluid passageways which fluidly connect the annular outer replenishment chamber to the inner working chamber upon an extension stroke of the piston,
    a first base valve mounted to the base cage, which first base valve opens the first set of fluid passageways during the compression stroke of the piston, and
    a second base valve mounted to the base cage, which second base valve opens the second set of fluid passageways during the extension stroke of the piston,
    wherein the second set of fluid passageways comprises a plurality of arcuate elongated slots formed through the base cage so that ends of the arcuate elongated slots are closely adjacent each other,
    wherein the base cage has an upper end and a lower end, and forming a replenishment fluid passageway formed between the lower end of the base cage and the base plate to fluidly connect the second set of fluid passageways to the outer replenishment chamber,
    wherein the second set of fluid passageways each include an outer wall and an inner wall extending downward from the upper end toward the lower end,
    wherein the inner wall of the second set of fluid passageways extends downward farther than the outer wall, and is positioned to direct fluid flowing past a bottom of the outer wall upward through the second set of fluid passageways,
    wherein the base plate comprises a frustoconical deflector wall aligned with the second set of fluid passageways,
    wherein the frustoconical deflector wall slopes radially inwardly and upwardly toward a lower end of the inner wall and away from the annular outer replenishment chamber, and
    wherein the frustoconical deflector wall is positioned proximately with respect to the lower end of the inner wall to direct fluid flowing from the annular outer replenishment chamber upward along the inner wall and toward the second set of fluid passageways.

2. The base valve assembly as defined in claim 1 wherein a portion of the base cage positioned radially outwardly from the outer wall of the second set of fluid passageways slopes upward toward the annular outer replenishment chamber on an outer periphery of the base cage.

3. The base valve assembly as defined in claim 1 wherein the bottom of the outer wall of the second set of fluid passageways is rounded.

4. The base valve assembly as defined in claim 1 wherein:
    the inner wall extending below the bottom of the outer wall forms at least a partial outwardly facing cylinder having an outer cylindrical surface facing outwardly toward the annular outer replenishment chamber, and
    the inner wall extends downward proximate to the frustoconical deflector wall to position the outer cylindrical surface with respect to the frustoconical deflector wall such that fluid is able to be deflected upward by the frustoconical deflector wall and directed upward along the outer cylindrical surface of the at least partial outwardly facing cylinder toward the second set of fluid passageways.

* * * * *